United States Patent

[11] 3,630,622

[72] Inventors Hendrik de Lang
 Delft;
 Gijsbertus Bouwhuis, Emmasingel,
 Eindhoven, both of Netherlands
[21] Appl. No. 847,903
[22] Filed Aug. 6, 1969
[45] Patented Dec. 28, 1971
[73] Assignee U.S. Philips Corporation
 New York, N.Y.
[32] Priority Aug. 8, 1968
[33] Netherlands
[31] 6811252

[54] APPARATUS FOR DETERMINING THE RELATIVE MOVEMENT OF AN OBJECT BY MEANS OF A GRATING MECHANICALLY CONNECTED TO THE OBJECT
 23 Claims, 7 Drawing Figs.
[52] U.S. Cl. .................................................. 356/114,
 250/225, 250/237, 356/170, 350/150, 350/151
[51] Int. Cl. ......................................................... G01n21/40,
 G01b 11/26

[50] Field of Search ................................................. 250/237,
 225; 356/169, 110, 114, 117, 118, 170; 350/150,
 151

[56] References Cited
UNITED STATES PATENTS
| 3,482,107 | 12/1969 | Hock ............................ | 356/169 |
| 3,489,908 | 1/1970 | Hock et al. .................... | 356/114 |
| 3,496,364 | 2/1970 | Foskett et al. ................ | 356/169 |
| 3,508,834 | 4/1970 | Hock et al. .................... | 356/169 |

Primary Examiner—Ronald L. Wibert
Assistant Examiner—J. Rothenberg
Attorney—Frank R. Trifari ABSTRACT: An apparatus for detecting the motion of an object attached to a grating wherein light impinges twice on different areas of the grating, first diffracting the light into various ordered subbeams. A phase-anisotropic element located in at least one subbeam and an electro-optic or magneto-optic modulator placed in the path of the composite beam produce orthogonally related beams, which after separation produce signals having a mutual phase difference varying about 180°.

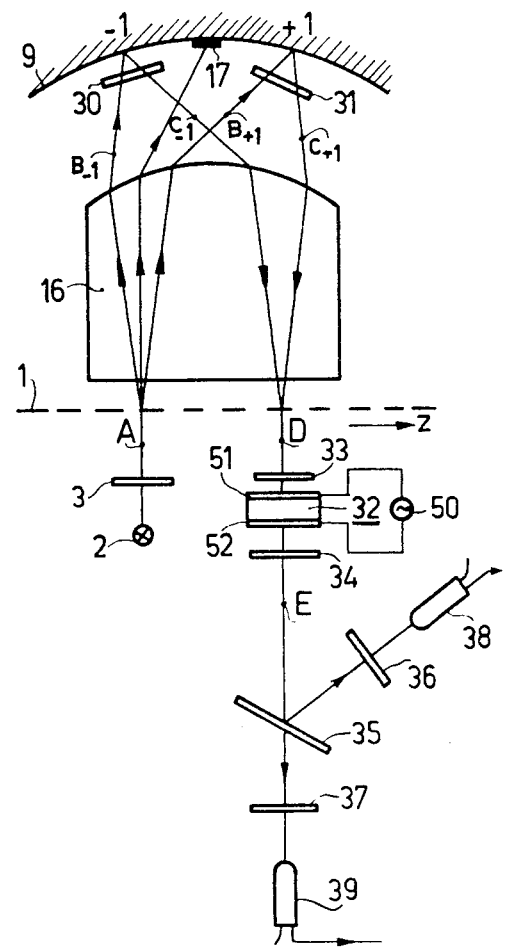
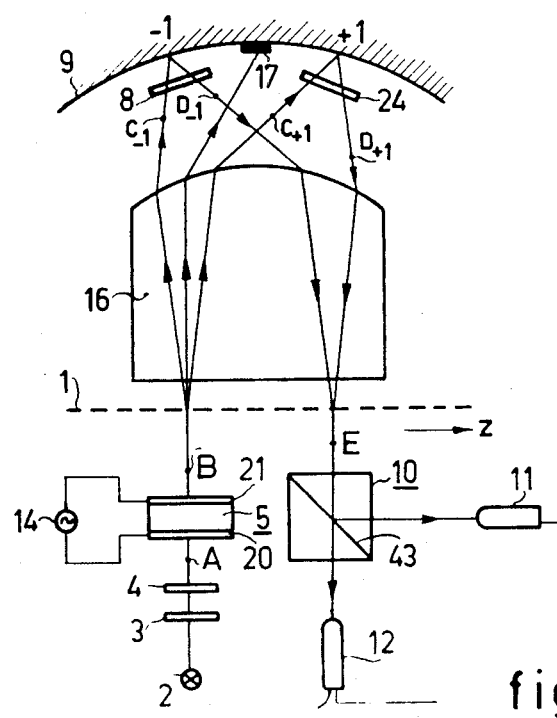
fig.4
fig.3

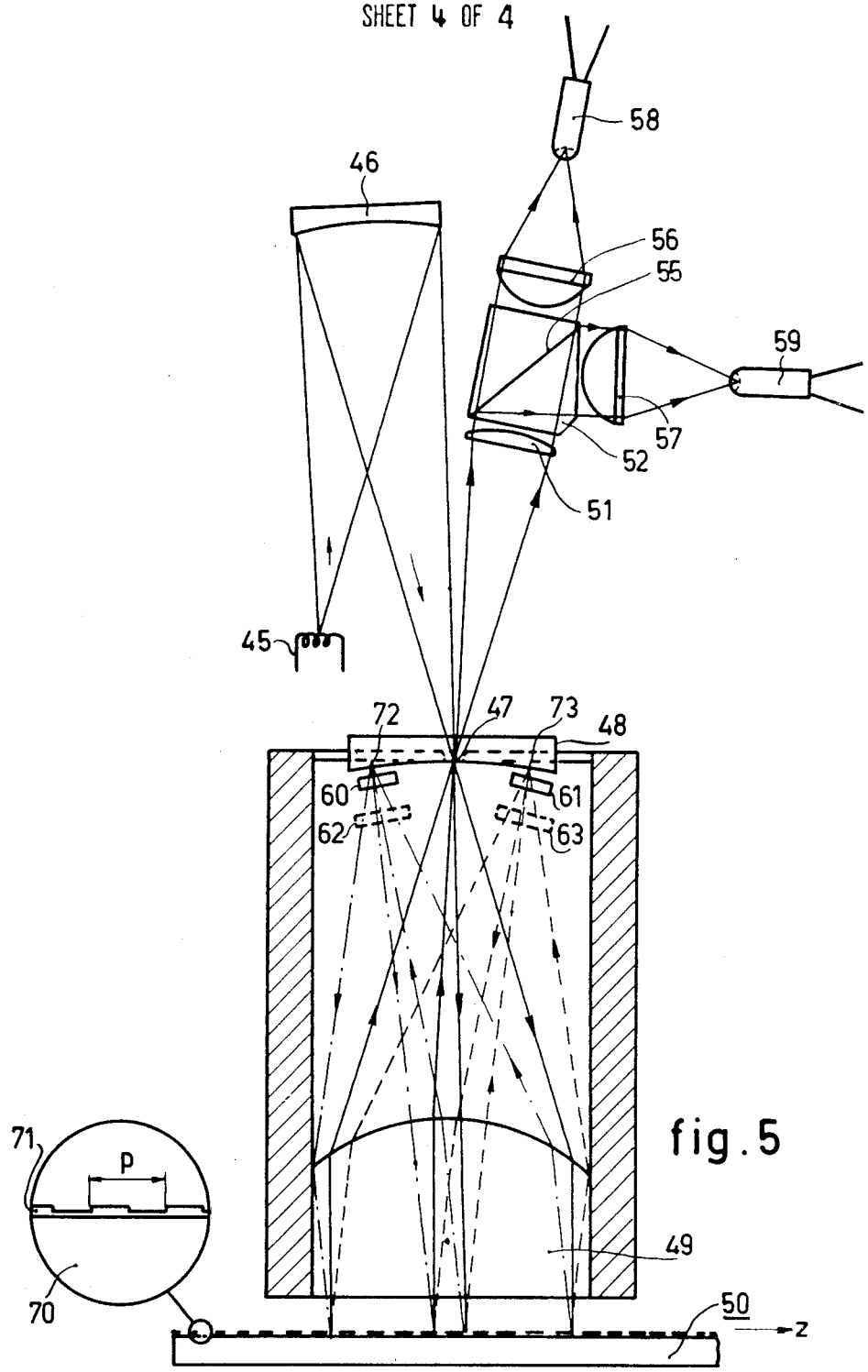

3,630,622

APPARATUS FOR DETERMINING THE RELATIVE MOVEMENT OF AN OBJECT BY MEANS OF A GRATING MECHANICALLY CONNECTED TO THE OBJECT

The invention relates to an apparatus for determining the relative movement of an object by means of a grating which is mechanically connected to the object and the grooves of which are at right angles to the direction of movement. The radiation from a source of radiation passes once or several times through the grating and an associated optical system which includes an anisotropic element. A modulator is disposed in the path of the radiation and the radiation is ultimately split up in a beam splitter into two spatially separated beams of radiation which each impinges on a photoelectric detector. In the case of movement, signals are produced in the photoelectric detector which have a mutual phase difference varying about an integral multiple of 180°.

In a known apparatus the modulator is a vibrating mirror. After the radiation has interacted with the grating it impinges on the vibrating mirror and is phase-modulated. A birefringent quartz plate is disposed between the grating and the mirror. After the incident natural radiation has twice passed through the quartz plate, it comprises two beams polarized at right angles to one another. By means of a polarization-sensitive beam-splitting interface these differently polarized beams, which give rise to periodic photoelectric signals which differ 90° in phase, are spatially separated.

The known apparatus has the disadvantage that the modulation of the radiation is effected by mechanical means, i.e. by a vibrating mirror. As a result, the modulation frequency is limited and in the case of high-relative speeds of the object this frequency restriction may require complicated circuits for the electronic processing of the signals. In addition, with a vibrating mirror the zero stabilization is a problem.

It is an object of the invention to provide an apparatus which does not suffer from this disadvantage.

For this purpose, the invention is characterized in that the modulator used is an electro-optical or magneto-optical modulator and in that there is disposed in the path of at least one of the beams which are diffracted by the grating and are of different orders of diffraction a phase-anisotropic element which causes a path length difference between orthogonally polarized beam components and differences in phase-anisotropy for the different orders of diffraction.

The invention will now be described more fully with reference to the accompanying drawings, in which:

FIG. 3 is a top plan view of a third embodiment of my invention,

FIG. 4 is a top plan view of a fourth embodiment of my invention,

FIG. 5 is a top plan view of a fifth embodiment of my invention,

Figure 1:
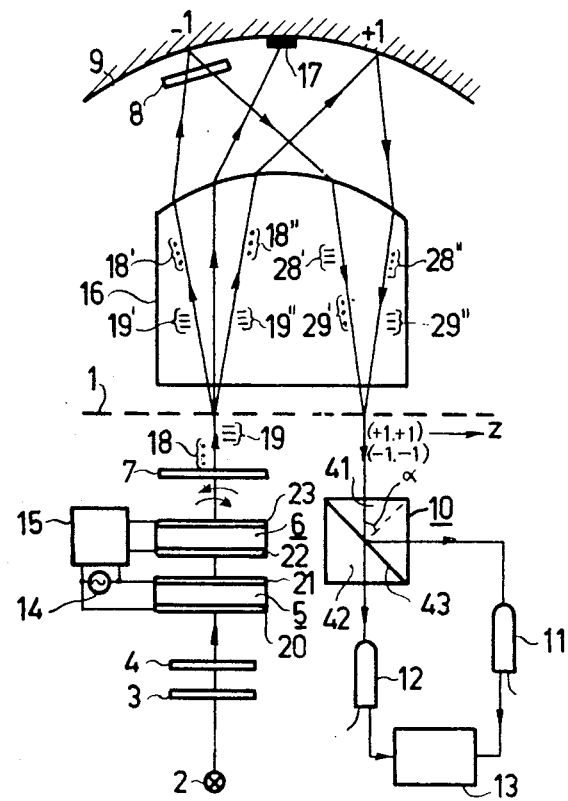
FIG. 1 is a top plan view of a first embodiment of my invention.

Referring now to FIG. 1, there is shown a displaceable grating 1 the lines of which are assumed to extend at right angles to the plane of the drawing. The grating 1 is rigidly secured to the object (not shown) the displacement of which is to be measured. The light from a light source 2 at an angular frequency $\omega$ is converted into plane-polarized light by a polarizer 3. The plane-polarized light rays only one of which is shown for clarity are in turn converted into circularly polarized rays by a $\lambda/4$ plate 4 the principal direction of which makes an angle of 45° with the direction of polarization of the polarizer 3. The circularly polarized rays pass through two electro-optical crystals 5 and 6 which are arranged in series and the principal directions of which make an angle of 45° with one another and which may be made, for example, from potassium dihydrophosphate ($KH_2PO_4$). By means of an alternating voltage source 14 and a phase-shifting network 15 axial electric fields of values $A_o \sin\Omega t$ and $A_o \cos\Omega t$ are set up between electrodes 20 and 21 of the crystal 5 and electrodes 22 and 23 of the crystal 6, respectively.

With a suitable choice of the amplitudes of the voltages applied to the crystals 5 and 6 the light emerging from the series arrangement of the two crystals consists of plane-polarized light the plane of polarization of which rotates at a substantially constant angular velocity $\Omega/2$ (cf. the prior U.S. Pat. application, Serial No. 762,107, filed Sept. 24, 1968, now U.S. Pat. No. 3,558,214. In other words, the light emerging from the crystals comprises two components, a circularly polarized beam 18 of angular frequency $\omega$ and a circularly polarized beam 19 of angular frequency $\omega-\Omega$. One of these beams is left-circularly polarized and the other is right-circularly polarized.

The circularly polarized beams 18 and 19 pass through a $\lambda/4$ plate 7, which converts them into two orthogonally polarized beams having a frequency difference of $\Omega$.

The grating 1 splits the orthogonally polarized beams into coherent subbeams. Especially subbeams of the orders $-1$, $0$ and $+1$ are produced. The subbeams pass through a planar convex lens 16 and onto a concave mirror 9. Because the center of curvature of the convex face of the lens 16 coincides with the center of curvature of the concave mirror 9, rays reflected at the mirror and refracted a second time at the convex face of the lens 16 again extend parallel to the rays which traverse the lens 16 towards the mirror 9. The zero-order subbeam is rendered inoperative by the provision of an absorbing layer 17 on the mirror 9.

A $\lambda/4$ plate 8 is arranged in diagonal position in the path of the subbeam of the order $-1$. The subbeam 18' at an angular frequency $\omega$, which has a direction of polarization at right angles to the plane of the drawing, after passing through the $\lambda/4$ plate 8, being reflected at the mirror 9 and passing again through the $\lambda/4$ plate 8 has been converted into a beam 28' at an angular frequency $\omega$ having a direction of polarization parallel to the plane of the drawing, the beam having effectively traversed a $\lambda/2$ plate arranged in diagonal position. Similarly, a subbeam 19' at the angular frequency $\omega-\Omega$ having a direction of polarization parallel to the plane of the drawing, is converted into a subbeam 29' at the angular frequency $\omega-\Omega$ having a direction of polarization at right angles to the plane of the drawing.

The subbeams 18" and 19" of the order $+1$ are reflected by the reflector 9. A beam 29" produced from the beam 19" obviously retains the angular frequency $\omega-\Omega$ and the same direction of polarization, i.e. a direction parallel to the plane of the drawing. A beam 28" produced from the beam 18" retains the angular frequency $\omega$ and the same direction of polarization, i.e. a direction at right angles to the plane of the drawing.

All the subbeams, i.e. 28', 28", 29' and 29", again are diffracted at the grating 1. The directionally coincident coherent beams of the order $(-1,-1)$ produced from the subbeams 28' and 29' and those of the order $(+1,+1)$ produced from the subbeams 28" and 29" impinge on a beam-splitting prism 10 comprising two component parts 41 and 42 which are cemented to one another along an interface 43 which has the correct orientation with respect to the principal direction of the $\lambda/4$ plate 7 and for example, is at right angles to the plane of the drawing. The interface 43 is provided with a coating consisting of thin layers of alternately high and low indices of refraction. The angle of incidence $\alpha$ of the coherent beams on the interface 43 is chosen so that the light is incident on the interfaces between the layers of high and low-refractive indices at approximately the Brewster angle. A suitable choice of the thickness of the layers ensures that light for which the direction of vibration is parallel to the plane of the drawing is largely transmitted and light for which the direction of vibration is at right angles to the plane of the drawing is largely reflected.

The transmitted light includes a component at the frequency $\omega$ and a component at the frequency $\omega-\Omega$, one component (at the frequency $\omega$) being derived from the beam of order $(-1, -1)$ and the other (at the frequency $\omega-\Omega$) from the beam of order $(+1, +1)$. A similar consideration applies to the reflected light, with the difference that the component at the frequency $\omega-\Omega$ is derived from the beam of order $(-1, -1)$ and the component at the frequency $\omega$ from that of order $(+1, +1)$.

It can be shown that the signals $I_1$ and $I_2$ derived from the detectors 11 and 12 and produced by the reflected and transmitted light, respectively, can be written as:

$$I_1 = \text{const.} + a\sin(\Omega t - 8\pi z/p)$$

and $$I_2 = \text{const.} + b\pi \sin(\Omega t + 8\pi z/p),$$

respectively.

In these expressions $a$ and $b$ represent the amplitude of the alternating voltage components of the signals $I_1$ and $I_2$, respectively, $z$ = displacement of the grating,
$p$ = period of the grating.

When the passages through zero of the signals are detected and applied to a counter 13, it will be apparent that each displacement $\Delta z = p/16$ will yield an additional passage through zero either of $I_1$ or of $I_2$.

Because the frequency $\Omega$ may be chosen to be comparatively high, the electronic apparatus for processing the signals measured may be comparatively simple.

Figure 1A:
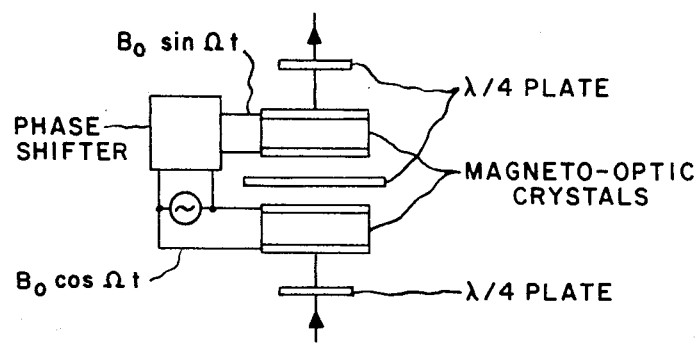
FIG. 1a represents a magneto-optic modulator.

In the apparatus shown in FIG. 1 the series combination of the electro-optical crystals 5 and 6 may be replaced by a series combination of two magneto-optical crystals (FIG. 1a), which series combination is enclosed between two $\lambda/4$ plates having the same principal direction, while a $\lambda/4$ plate the principal direction of which makes an angle of 45° with that of the other plates is arranged between the magneto-optical crystals.

In the magneto-optical crystals, which exhibit the Faraday effect, magnetizations $B_1 = B_o\sin\Omega t$ and $B_2 = B_o\cos\Omega t$, respectively, are produced which extend parallel or substantially parallel to the direction of propagation of the radiation traversing the respective crystal. The amplitude $B_0$ is chosen to be so large that the plane of polarization of plane-polarized light incident on the respective crystal is rotated 45° at this value of the magnetization.

It can be shown that in this series combination circular polarized radiation is converted into plane-polarized radiation the plane of polarization of which is rotated at a substantially constant angular velocity.

Figure 2:
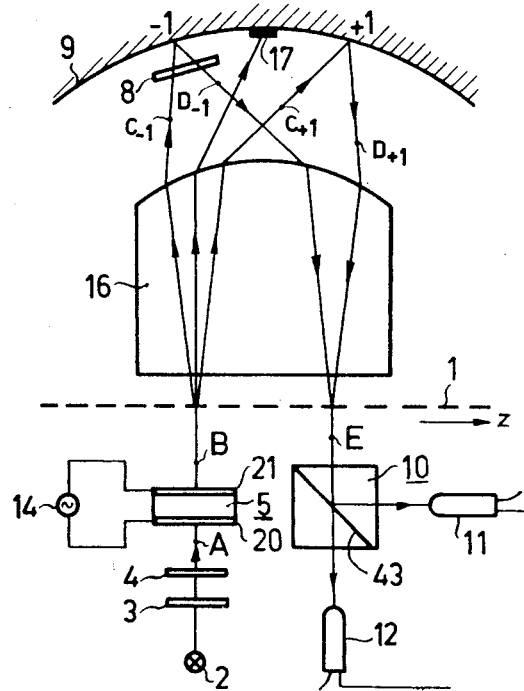
FIG. 2 is a top plan view of a second embodiment of my invention.

In the apparatus shown in FIG. 2, elements similar to those of FIG. 1 are designated by the same reference numerals. The circularly polarized rays emerging from the $\lambda/4$ plate 4 pass through the electro-optical crystal 5, which may be made, for example, of potassium dihydrophosphate. By means of the alternating voltage source 14 an axial electrical field of value $A_o\sin\Omega$ is applied between the electrodes 20 and 21 of the crystal. Before the circularly polarized radiation passes through the crystal 5, it may be split, for example at a location A, into two orthogonally polarized beams of radiation of value $A_1\cos\Omega$ and $A_1\sin\Omega t$, respectively. In the crystal one of the beams is retarded relatively to the other beam, because for one of the beams, for example that of which the direction of polarization is parallel to the plane of the drawing and is represented by $A_1\cos\Omega t$, the refractive index increases and that for the other beam, which is represented by $A_1\sin\Omega t$, decreases by an amount which is a function of the instantaneous field strength $A_o\sin\Omega t$. After having passed through the crystal 5, for example at a point B, the two beams can be represented by $A_1\cos(\omega t + b\sin\Omega t)$ and $A_1\sin(\omega t - b\sin\Omega t)$, respectively.

The grating 1 splits the beam in coherent subbeams which pass through the planoconvex lens 16 and impinge on the mirror 9. Before being reflected at the mirror 9 the two orthogonally polarized subbeams of order $-1$ pass through the $\lambda/4$ plate 8 arranged in diagonal position. Before passing through the $\lambda/4$ plate, for example at a point $C_{-1}$, the subbeam for which the direction of polarization is parallel to the plane of the drawing is represented by: $A_2\cos(\omega t + b\sin\Omega t - 2\pi z/p)$, and the subbeam for which the direction of polarization is at right angles to the plane of the drawing is represented by: $A_2\sin(\omega b1b\sin\Omega t - 2\pi z/p)$.

The two orthogonally polarized subbeams of order $+1$ before their reflection at the mirror 9, for example at the point $C_{117\,1}$, can be represented by $A_2\cos(\omega t + b\sin\Omega t + 2\pi z/p)$ and
$A_2\sin(\omega t - b\sin\Omega t + 2\pi z/p)$, respectively. The sign of the term $2\pi z/p$ is determined by the chosen positive $z$ direction of the grating 1 and also by the asymmetry of the plane wave fronts of the beams of orders $-1$ and $+1$ relative to the grating structure.

The $\lambda/4$ plate 8 arranged in the path of the two orthogonally polarized subbeams of order $-1$ is twice traversed by these two subbeams. Thus, these beams have effectively traversed a $\lambda/2$ plate arranged in diagonal position. After its second passage, for example at the point $D_{-1}$, the subbeam having a direction of polarization parallel to the plane of the drawing can be represented by: $A_3\sin(\omega t - b\sin\Omega t - 2\pi z/p)$, and that having a direction of polarization at right angles to the plane of the drawing by $A_3\cos(\omega t + b\sin\Omega t - 2\pi z/p)$.

The subbeams of order $+1$ reflected at the mirror 9 retain their direction of polarization. After reflection, for example at the point $D_{+1}$, the subbeam having a direction of polarization parallel to the plane of the drawing can be represented by: $A_3\cos(\omega t + b\sin\Omega t + 2\pi z/p)$ and that having a direction of polarization at right angles to the plane of the drawing by: $A_3\sin(\omega t - b\sin\Omega t + 2\pi z/p)$. (It should be noted that the zero-order subbeam is rendered inoperative by the provision of an absorbing layer 17 on the mirror 9).

All the subbeams are again diffracted at the grating 1. From the grating there emerge directionally coincident coherent subbeams of order $(-1, -1)$, which derive from the subbeams at the point $D_{-1}$, and of order $(+1, +1)$, which derive from the subbeams at the point $D_{+1}$. These subbeams may, for example at E, be represented by:

$A_4\sin(\omega t - b\sin\Omega t - 4\pi z/p)$ and
$A_4\cos(\omega t + b\sin\Omega t - 4\pi z/p)$, and by
$A_4\cos(\omega t + b\sin\Omega t + 4\pi z/p)$ and
$A_4\sin(\omega t - b\sin\Omega t + 4\pi z/p)$, respectively.

The first of each pair of quantities corresponds to a subbeam which is polarized in a direction parallel to the plane of the drawing, and the second of each pair of quantities corresponds to a subbeam which is polarized in a direction at right angles to the plane of the drawing. The additional term $2\pi z/p$ is again due to the diffraction at the grating 1.

In the polarization-separating beam-splitting prism 10 the subbeams having a direction of polarization parallel to the plane of the drawing are separated at the interface 43 from the subbeams having a direction of polarization at right angles to the plane of the drawing. The former subbeams follow a straight path and are intercepted by the photoelectric cell 12, the latter subbeams are entirely or substantially entirely reflected and strike the photoelectric cell 11.

The sum of the former subbeams as a function of time is:
$A_4\sin(\omega t - b\sin\Omega t - 4\pi z/p) + A_4\cos(\omega t + b\sin\Omega t + 4\pi z/p) = 2A_4\sin(\omega t + \pi/4)\sin(-b\sin\Omega t - 4\pi z/p + \pi/4)$.

The sum of the latter subbeams as a function of time is:
$A_4\cos(\omega t + b\sin\Omega t - 4\pi z/p) + A_{\gamma+sin}(\omega t - b\sin\Omega t + 4\pi z/p) = 2A_4\sin(\omega t + \frac{2}{3}4)\sin(-b\sin\Omega t + 4\pi z/p + \pi/4)$.

For the intensities we have:
$I_1 \approx \sin^2(-b\sin\Omega t - 4\pi z/p + \pi/4)$ and
$I_2 \approx \sin^2(-b\sin\Omega t + 4\pi z/p + \pi/4)$, respectively.

The alternating components of $I_1$ and $I_2$ are proportional to:
$\cos(-2b\sin\Omega t - 8\pi z/p + \pi/2)$ and to
$\cos(-2b\sin\Omega t + 8\pi z/p + \pi/2)$, respectively.

By the photoelectric cells 12 and 11 respectively these signals are converted to electric signals which are processed in any convenient manner. A variation of $z$ by $p/32$ results in additional passage through zero of either $I_1$ or $I_2$.

In the apparatus shown in FIG. 2 the series combination of the $\lambda/4$ plate 4 and the electro-optical crystal 5 may be replaced by the series combination of a magneto-optical crystal exhibiting the Faraday effect and a λ/4 plate the principal direction of which makes 4 of 45° with that of the polarizer 3. In the magneto-optical crystal, a magnetization $B=B_0\sin\Omega t$ is produced which is at least substantially parallel to the direction of propagation of the beam of radiation in the crystal. In the magneto-optical crystal the plane of polarization of the plane-polarized beam emerging from the polarizer 3 is rotated through an angle proportional to $\sin\Omega t$. In the λ/4 plate following the Faraday rotator, the plane-polarized radiation is reconverted to substantially circularly polarized radiation which can be resolved into mutually perpendicularly polarized components.

$A_1\cos(\omega t+b\sin\Omega t)$ and $A_1\sin(\omega t-b\sin\Omega t)$.

The optical part of the apparatus shown in FIG. 3 is largely equal to that of the apparatus shown in FIG. 2. The sole difference is that there is arranged in the path of the subbeam of order +1 a λ/8 plate 24, which is absent in the apparatus shown in FIG. 2. The principal direction of the λ/8 plate is parallel to the plane of the drawing.

At the point $C_{-1}$ the subbeam of order −1 the direction of polarization of which is parallel to the plane of the drawing can again be represented by: $A_2\cos(\omega t+b\sin\Omega t-2\pi z/p)$ and the subbeam the direction of polarization of which is at right angles to the plane of the drawing can be represented by: $A_2\sin(\omega t-b\sin\Omega t-2\pi z/p)$. Similarly, at a point $C_{+1}$ the subbeam of order +1 for which the direction of polarization is parallel to the plane of the drawing can be represented by $A_2\cos(\omega t+b\sin\Omega t+2\pi z/p)$ and that for which this direction is at right angles to the plane of the drawing by: $A_2\sin(\omega t-b\sin\Omega t+2\pi z/p)$.

The subbeams of order −1 again pass twice through the λ/4 plate 8 arranged in diagonal position, so that at a point $D_{-1}$ the subbeam having a direction of polarization parallel to the plane of the drawing can be represented by $A_3\sin(\omega t+b\sin\Omega t-2\pi z/p)$ and that having a direction of polarization at right angles to the plane of the drawing by $A_3\cos(\omega t+b\sin\Omega t-2\pi z/p)$.

The subbeams of order +1 twice traverse the λ/8 plate 24 for which the principal direction is parallel to the direction of polarization of one of the subbeams. Thus, these subbeams which are reflected at the mirror 9 effectively pass through a λ/4 plate arranged in parallel position. Hence, for one of the beams the path length has been changed by λ/4 relative to the other beam. At the point $D_{+1}$ the subbeam having a direction of polarization parallel to the plane of the drawing can consequently be represented by: $A_3\cos(\omega t+b\sin\Omega t+2\pi z/p)$, and that having a direction of polarization at right angles to the plane of the drawing by: $A_3\cos(\omega t-b\sin\Omega t+2\pi z/p)$.

All the subbeams again experience diffraction at the grating 1. From the grating 1 there emerge directionally coincident coherent subbeams of order (−1, −1) which derive from the subbeams at the point $D_{-1}$ and of order (+1, +1) which derive from subbeams at the point $D_{+1}$. These subbeams can be represented, for example at E, by:

$A_4\sin(\omega t-b\sin\Omega t-4\pi z/p)$ and
$A_4\cos(\omega t-b\sin\Omega t+4\pi z/p)$; and by:
$A_4\cos(\omega t+b\sin\Omega t-4\pi z/p)$ and
$A_4\cos(\omega t-b\sin\Omega t+4\pi z/p)$, respectively.

The first of each pair of quantities represents a subbeam which is polarized in a direction parallel to the plane of the drawing, and the second of each pair of quantities represents a subbeam which is polarized at right angles to the plane of the drawing.

In the polarization-separating beam-splitting prism 10, the subbeams having a direction of polarization parallel to the plane of the drawing are again separated at the interface 43 from those having a direction of polarization at right angles to the plane of the drawing.

A sum of the former subbeams striking the photoelectric cell 12 as a function of time is:

$A_4\sin(\omega t-b\sin\Omega t-4\pi z/p)+A_4\cos(\omega t+b\sin\Omega t+4\pi z/p)=2A_4\sin(\omega t+\pi/4)\sin(-b\sin\Omega t-4\pi z/p+\pi/4)$. The sum of the latter subbeams striking the photoelectric cell 11 as a function of time is:

$A_4\cos(\omega t+b\sin\Omega t-4\pi\pi z/p)+A_4\cos(\omega t-b\sin\Omega t+4\pi z/p)=2A_4\cos\omega t\cos(\sin\Omega t-4\pi z/p)$.

For the intensities of the subbeams we have:
$I_1\approx\sin^2(-b\sin\Omega t-4\pi z/p+\pi/4)$ and
$I_2\approx\cos^2(b\sin\Omega t-4\pi z/p)$. The alternating components of $I_1$ and $I_2$ are proportional to $\cos(-2b\sin\Omega t-8\pi z/p+\pi/2)=\sin(2b\sin\Omega t+8\pi z/p)$ and to $\cos(2b\sin\Omega-8\pi z/p)$, respectively.

Thus we again have two signals which differ 90° in phase and hence give simple directional detection. The signals are modulated so that even when the grating 1 is stationary an alternating voltage signal is produced. At a displacement $\Delta z=p/32$, again a passage through zero of either $I_1$ or $I_2$ occurs.

As is the case in the apparatus shown in FIG. 2, in the apparatus shown in FIG. 3 the series combination of the λ/4 plate 4 and the electro-optical crystal 5 may be replaced by the series combination of a magneto-optical crystal which exhibits the Faraday effect and in which the magnetization $B=B_0\sin\Omega t$ is produced and of a λ/4 plate the principal direction makes an angle of 45° with that of the polarizer 3.

In the apparatus shown in FIG. 4, elements corresponding to those of FIG. 1 are again designated by like reference numerals. The light from the light source 2 at an angular frequency $\omega$ is converted by the polarizer 3 into plane-polarized light for which the direction of polarization may, for example, be parallel to the plane of the drawing. At the point A the beam can be represented by $A_1\sin\omega t$. The grating 1 splits the beam into coherent subbeams which pass through the planar convex lens 16 and onto the concave mirror 9. The subbeam of order −1 can, for example at the point $B_{-1}$, be represented by: $A_2\sin(\omega t-2\pi z/p)$, and that of the order +1, for example at the point $B_{+1}$, by: $A_2\sin(\omega t+2\pi z/p)$. The zero-order beam is again rendered inoperative by the provision of an absorbing layer 17 on the mirror 9.

Before the subbeams of orders +1 and −1 impinge on the mirror 9, they each traverse a λ/8 plate 30 and 31, respectively, the principal directions of which are at right angles to one another and each make an angle of 45° with the direction of polarization of the subbeams. After being reflected at the mirror 9, the subbeams again pass through the λ/8 plates 30 and 31, respectively. They then have effectively traversed a λ/4 plate. As a result of their passage through an effective λ/4 plate arranged in diagonal position, each of the two plane-polarized light beams has been converted into a circularly polarized beam. Because the principal directions of the λ/8-plates 30 and 31 are at right angles to one another, one beam, for example that of order −1 and for example at $C_{-1}$, is a right-circularly polarized beam of phase $(\omega t-2\pi z/p)$, while the other beam for example at the position $C_{+1}$, is a left-circularly polarized beam of phase $(\omega t+2\pi t+2\pi z/p)$.

The coherent subbeams are again diffracted at the grating 1. From the grating 1 there emerge directionally coincident coherent subbeams of order (−1, −1), which are formed from the subbeams at the location $C_{-1}$, and of order (+1, +1), which are formed from the subbeams at the location $C_{+1}$. The directionally coincident subbeams can be represented, for example at the location D, by a right-circularly polarized beam of phase $(\omega t-4\pi z/p)$ and a left-circularly polarized beam of phase $(\omega t+4\pi z/p)$. The phase difference of the two beams is $\phi=8\pi z/p$. The sum of the beams can be represented by a plane-polarized oscillation for which the orientation $\alpha$ of the plane of polarization is a linear function of the distance $z$: $\alpha=C_0+1/2\phi C_0-4\pi z/p$.

The plane-polarized radiation falls on a magneto-optical crystal exhibiting the Faraday effect. The rotation of the plane of polarization of the plane-polarized radiation incident on the crystal is a linear function of the magnetization produced in the crystal: $B=B_0\sin\Omega t$. Hence, the orientation of the plane of polarization of the plane-polarized beam emerging from the magneto-optical crystal can be represented, for example at the position E, by $\alpha(z,t)=C-4\pi z/p+z/p \beta_1\sin\Omega t$.

The plane-polarized oscillation may also be caused to impinge on the series combination of a λ/4 plate 33, an electro-optical crystal 32 made, for example, of potassium dihydrophosphate, and a λ/4 plate 34. The principal directions of the λ/4 plates 33 and 34 are parallel to one another; the principal direction of the crystal 32 is inclined at an angle of 45° to that of the plates 33 and 34. By means of an alternating voltage source 50 there is applied to the crystal 32 an alternating voltage $V=V_o\sin\Omega t$ such that the field strength produced in the crystal by the voltage is parallel to the direction of propagation of the radiation in the crystal 32.

In a commonly assigned copending U.S. application, Ser. No. 780,750, filed Dec. 3, 1968, it has been shown that orientation of the plane of polarization of the plane-polarized beam emerging from the series combination is represented, neglecting the initial orientation, by: $\beta\sin\Omega t$. In this expression, $\beta$ is the amplitude of the angle of rotation of the plane of polarization.

Hence, the orientation of the plane of polarization of the plane-polarized beam emerging from the $\lambda/4$ plate 34, can be represented, for example, at the location E, by $\alpha(z,t)=C_1-4\pi z/p+\sin\Omega t$. An isotropic beam-splitting mirror 35 splits the beam into two subbeams. One subbeam passes through a polarizer 36 and onto a photoelectric cell 38, the other subbeam passes through a polarizer 37 and onto a photoelectric cell 39. The directions of polarization of the polarizers 36 and 37 are inclined at an angle of 45° to one another.

The output signals of the photoelectric cells, which are proportional to the intensities of the incident subbeams, have the forms:

$s_1=C_2+S\sin2\alpha(z,t)=C_2+S\sin(2C_1-8\pi z/p+2\beta\sin\Omega t)$, and
$s_2=C_2+S\cos2\alpha(z,t)=C_2+S\cos(2C_1-8\pi z/p+2\beta\sin\Omega t)$, respectively. These signals may be further processed, for example in the manner described in the copending U.S. application, Ser. No. 780,750, filed Dec. 3, 1968, corresponding to British application 565 73/68 or in the French Pat. Specification 1,308,993. When the grating is displaced through a distance $\Delta z=p/16$, a passage through zero of either $S_1$ or $S_2$ again occurs. To the orientation $\alpha_o$ of the plane of polarization of the beam of the beam of plane-polarized radiation emerging from the grating 1 there may be added a time-linear rotation $ct$ so that the orientation $\alpha$ of the plane of polarization as a function of time becomes $\alpha=\alpha_o+ct$. This simplifies the electric processing of the output signals of the detectors 38 and 39.

The addition may be performed by means of one of the apparatus described in the copending application of prior date, U.S. Pat. Ser. No. 3,558,215, FIG. 4, which include at least one electro-optical crystal, or by means of the apparatus described in copending application of prior date U.S. Pat. No. 3,518,215, FIG. 1, which includes three electro-optic crystals.

Figure 4A:
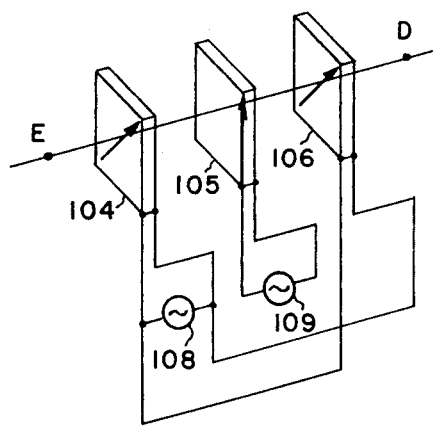
FIG. 4a represents an electo-optic modulator.

FIG. 4a shows the modulator disclosed in FIG. 1 of U.S. Pat. No. 3,558,215 inserted between D and E of FIG. 4. The principle directions of the outer crystals 104 and 106 are parallel and inclined at an angle of 45° to the principle axis of the center crystal 105. The modulating signal 108 applied to the outer crystals 104 and 106 is sinusoidal and corresponds to a path length difference of substantially a quarter wavelength in each crystal. The amplitude of the sinusoidal voltage applied by source 109 to the center crystal 105 is phase-shifted one quarter wavelength with respect to the signal 108 and has an amplitude corresponding to a path length difference of substantially one half wavelength in this center crystal.

In the apparatus shown in FIG. 5, the beam of natural light from a source of light 45 is reflected at a concave mirror 46 and then passes through a small aperture 47 in or near a concave mirror 48. The light then passes through a single or compound planoconvex lens 49 and onto a reflection grating 50. The distance between the concave mirror 46 and the light source 45 is such that an image of the light source 45 is formed substantially in the aperture 47. The aperture 47 is located substantially at the focal point of the planoconvex lens 49, so that parallel light rays are incident on the grating 50. The grating 50 is a phase grating of the reflection type. It may be in the form of, for example, a glass substrate 70 on which is provided a periodic line structure 71 of aluminum. The height of the line structure 71 varies with a period $p$. The difference in height between adjacent lines is such that the phase difference between light beams reflected at adjacent lines is substantially equal to $\pi$ radians.

From the reflection grating 50 coherent subbeams of orders $-1$ and $+1$ are reflected, which can be represented by $A_1\sin(\omega t-2\pi z/p)$ and $A_1\sin(\omega t+2\pi z/p)$ respectively. These subbeams are focused at locations 72 and 73 respectively of the concave mirror 48 and from these locations they are reflected to the grating 50. Electro-optical crystals 60 and 61, which may be made of potassium dihydrophosphate, are included in the path of the subbeams at points immediately in front of the locations 72 and 73. By means of an alternating voltage source (not shown) an axial electric field of value $A_o\sin\Omega$ is applied to the crystals 60 and 61.

Assuming each of the beams incident on the crystals 60 and 61 respectively to be split up into two subbeams polarized at right angles to one another, one of the beams is retarded in the respective crystal with respect to the other beam in this crystal, for the index of refraction of one of the beams, for example the beam for which the direction of polarization is parallel to the plane of the drawing, increases and that for the other beam decreases by an amount which is a function of the instantaneous field strength $A_o\sin\Omega t$. For the subbeam for which the direction of polarization is parallel to the plane of the drawing the phase retardation in the crystal 60 is $\Delta\phi_1=\phi\sin\Omega t$, and for the subbeam for which the direction of polarization is at right angles to the plane of the drawing it is $\Delta\phi_2=-\phi\sin\Omega t$.

Care is taken to ensure that the principal direction of the crystal 61 is perpendicular to that of the crystal 60. In the case, for the subbeam for which the direction of polarization is parallel to the plane of the drawing, the phase change is: $\Delta\phi_3=-\Delta\phi_1=-\phi\sin\Omega t$, and for the subbeam for which the direction of polarization is at right angles to the plane of the drawing the phase change is: $\Delta\phi_4=-\Delta\phi_2=\phi\sin\Omega t$. Since both crystals are twice traversed by the associated subbeams, i.e. before and after reflection of the beams at the locations 72 and 73 of the mirror 48, the overall phase change is twice the above-mentioned values. For beams reflected at the mirror 48 and travelling towards the grating 50 the following expressions hold.

For the subbeam of order $-1$ having a direction of polarization parallel to the plane of the drawing:
$A_2\sin(\omega t-2\pi z/p+2\phi\sin\Omega t)$;

For the subbeam of order $-1$ having a direction of polarization at right angles to the plane of the drawing:
$A_2\sin(\omega t-2\pi z/p-2\phi\sin\omega t)$;

for the subbeam of order $+1$ having a direction of polarization parallel to the plane of the drawing:
$A_2\sin(\omega t+2\pi z/p-2\phi\sin\Omega t)$;

for the subbeam of order $+1$ having a direction of polarization at right angles to the plane of the drawing:
$A_2\sin(\omega t+2\pi z/p+2\phi\sin\Omega t)$.

These four subbeams pass through the lens 49 and are again reflected at the phase grating 50. From the subbeams twice reflected at the phase grating those beams are selected which after reflection form an image of the aperture 47 in this aperture, i.e. the beams of the orders of diffraction $(-1,-1)$ and $(+1,+1)$. Beyond the aperture 47, for example at the location of the lens 51, these beams can be represented as follows:

The subbeam of order $(-1,-1)$ having a direction of polarization parallel to the plane of the drawing:
$A_3\sin(\omega t-4\pi z/p+2\phi\sin\omega t)$;

the subbeam of order $(-1,-1)$ having a direction of polarization at right angles to the plane of the drawing:
$A_3\sin(\omega t-4\pi z/p-2\phi\sin\Omega t)$;

the subbeam of order $(+1,+1)$ having a direction of polarization parallel to the plane of the drawing:
$A_3\sin(\omega t+4\pi z/p-2\phi\sin\Omega t)$;

the subbeam of order $(+1,+1)$ having a direction of the polarization at right angles to the plane of the drawing:
$A_3\sin(\omega t+4\pi z/p+2\phi\sin\Omega t)$.

These four subbeams fall on a polarization-separating beam-splitting prism 52. At the interface 55, which is coated with thin layers of alternately high and low-refractive refractive indices, the subbeams for which the plane of polarization is parallel to the plane of the drawing are transmitted and pass through a lens 56 and onto a photoelectric cell 58. The subbeams for which the plane of polarization is at right angles to the plane of the drawing, pass through a lens 57 and onto a photoelectric cell 59.

For the sum of the former subbeams we have:

$$A \sin(\omega t - 4\pi z/p + 2\phi \sin\Omega t) + A_3 \sin(\omega t + 4\pi z/p - 2\phi \sin\Omega t) = 2A_3 \sin\omega t \cos(4\pi z/p - 2\phi \sin\Omega t).$$

For the sum of the latter subbeams we have:

$$A_3 \sin(\omega t - 4\pi z/p - 2\phi \sin\Omega t) + A_3 \sin(\omega t + 4\pi z/p + 2\phi \sin\Omega t) = 2A_3 \sin\omega t \cos(4\pi z/p + 2\phi \sin\Omega t).$$

The electric signals which are produced by the photoelectric cells 58 and 59 are proportional to the intensity of the radiation supplied to the respective photoelectric cell, i.e. the alternating parts are proportional to $\cos(8\pi z/p - 4\phi \sin\Omega t)$ and to $\cos(8\pi z/p + 4\phi \sin\Omega t)$, respectively. When there are included in the paths of the beams of radiation of orders $-1$ and $+1$, between the electro-optical crystals 60 and 61 respectively and the lens 49, $\lambda/16$ plates 62 and 63 respectively having their principal directions parallel to those of the crystals 60 and 61 respectively, which plates are twice traversed and effectively are $\lambda/8$ plates, it can be shown that one of the electric signals is shifted 90° in phase with respect to the other, so that these signals are proportional to $\cos(8\pi z/p - 4\phi \sin\Omega t)$ and to $\sin(8\pi z/p + 4\phi \sin\Omega t)$, respectively. An identical 90° phase shift is obtained by including a $\lambda/8$ plate in one of the beams of radiation of orders $-1$ and $+1$.

Thus, the directional detection may be performed in a simple manner.

The series combination of the electro-optical crystal 60 and the $\lambda/16$ plate 62 and that of the electro-optical crystal 61 and the $\lambda/16$ plate 63 may each be replaced by a magneto-optical crystal. The magnetization produced in the crystals will then be $+B_0 + B_1 \sin\omega t$ and $-B_0 - B_1 \sin\omega t$, respectively. The constant term $B_0$ produces a Faraday rotation of $45°/4 = 11°15'$. A $\lambda/4$-plate which converts the circular beam component to linear beam components is included in the light path at a position preceding the lens 51. The combination of the Faraday rotators and the $\lambda/4$-plate preceding the lens 51 again gives rise to the production of two signals which differ 90° in phase.

Obviously, the gratings in the apparatuses according to the invention may be either reflection gratings or transmission gratings.

In the apparatus shown in FIG. 4, the plane-polarized oscillation emerging from the grating 1 may of course fall directly on the isotropic beam-splitting mirror 35. In this case, with stationary grating 1 the detectors 38 and 39 will receive direct current signals.

What is claimed is:

1. An apparatus for determining the relative movement of an object, comprising a grating mechanically connected to the object and having the lines thereof aligned at right angles to the direction of movement, a source of polarized radiation for projecting polarized radiation on a first portion of the grating whereby the beam is diffracted into a plurality of subbeams, a phase-anisotropic element in the path of at least one of the subbeams, an electromagnetic field responsive birefringent optical modulator in the path of the radiation, means for directing the subbeams on to another portion of the grating whereby the subbeams are recombined, a beam splitter in the path of the recombined beam for spatially separating orthogonally polarized portions of the recombined beam, a photoelectric detector in the path of each of the spatially separated beams from the beam splitter, and means for producing a time-varying electromagnetic field in the modulator.

2. An apparatus as claimed in claim 1, characterized in that the modulator includes at least one electro-optical crystal.

3. An apparatus as claimed in claim 2, characterized in that the modulator comprises two $\lambda/4$-plates having aligned optic axes, between which is arranged an electro-optical crystal which has an orientation differing by 45° from that of the $\lambda/4$-plates and to which an electric voltage is applied.

4. An apparatus as claimed in claim 2 characterized in that a sawtooth voltage is applied to the electro-optical crystal, the voltage difference between the maximum and minimum values of the sawtooth voltage corresponding to a phase-anisotropy of 360° of the plane-polarized radiation produced by the modulator.

5. An apparatus as claimed in claim 2, characterized in that the modulator comprises three electro-optical crystals, the principal direction of the middle crystal being inclined at an angle of 45° to the mutually parallel principal directions of the two other crystals.

6. An apparatus as claimed in claim 2, characterized in that the modulator comprises $(2n+1)$ electro-optical crystals (where $n$ is an integer), the principal direction of the even-numbered crystals being inclined at an angle of 45° to that of the odd-numbered crystals.

7. An apparatus as claimed in claim 6, characterized in that there is a phase difference of 90° between the voltage applied to the odd-numbered crystals of the modulator and that applied to the even-numbered crystals.

8. An apparatus as claimed in claim 5, characterized in that the amplitude of the voltage applied to both outer crystals corresponds to a path-length difference of substantially a quarter wavelength in the respective crystal, while the amplitude of the voltage applied to the middle crystal corresponds to a path-length difference of substantially a half wavelength in this crystal.

9. An apparatus as claimed in claim 2 characterized in that said crystal comprises several component crystals and the amplitude of the voltage applied to each component crystal is smaller than that applied to the undivided crystal by a factor proportional to the number of component crystals.

10. An apparatus as claimed in claim 2 characterized in that in the path of one of the beams diffracted by the grating there is included an $n\lambda/4$-plate (where $n$ is odd) which is twice traversed by the respective beam.

11. An apparatus as claimed in claim 1 characterized in that in the path of one of the beams diffracted by the grating there is arranged an $n\lambda/4$-plate (where $n$ is odd) and in the path of another beam diffracted by the grating there is arranged an $m\lambda/8$ plate (where $m$ is odd) in a manner such that the principal directions of the plates make an angle of 45° with one another.

12. An apparatus as claimed in claim 1 characterized in that in each of two beams diffracted by the grating there is arranged an $n\lambda/8$ plate (where $n$ is odd), the arrangement being such that the principal directions of the plates make an angle of 90° with one another.

13. An apparatus as claimed in claim 2 characterized in that the electro-optical modulator is arranged in the path of one of the beams diffracted by the grating and a second electro-optical modulator is arranged in the path of another beam diffracted by the grating, the arrangement being such that the principal directions of the two crystals make an angle of 90° with one another.

14. An apparatus as claimed in claim 13, characterized in that in the path of each of the two beams diffracted by the grating there is arranged an $n\lambda/16$-plate (where $n$ is odd) the principal direction of which is parallel to that of the electro-optical crystal arranged in the path of the respective beam.

15. An apparatus as claimed in claim 13, characterized in that there is arranged in the path of one of the beams diffracted by the grating an $n\lambda/8$-plate (where $n$ is odd) the principal directions of which is parallel to that of the electro-optical crystal arranged in the path of the respective beam.

16. An apparatus as claimed in claim 1, characterized in that the modulator includes at least one magneto-optical crystal.

17. An apparatus as claimed in claim 16, characterized in that the magneto-optical modulator includes three magneto-optical crystals which are each flanked on both sides by $n\lambda/4$ plates the principal directions of which are either the same or inclined to one another at an angle of 90°, and in that the principal directions of the $n\lambda/4$ plates which flank the middle crystal are inclined at an angle of 45° to the principal directions of the $n\lambda/4$-plates which flank the outer crystals (where $n$ is odd).

18. An apparatus as claimed in claim 16, characterized in that there is produced in the crystal or crystals a magnetization which has a sawtooth shape, the difference between the maximum and minimum values of this magnetization corresponding to a rotation through 180° of the orientation of the plane of polarization of plane-polarized radiation.

19. An apparatus as claimed in claim 16, characterized in that the magneto-optical modulator comprises the series combination of two magneto-optical crystals, which series combination is enclosed by two $n\lambda/4$-plates having the same principal directions, whilst there is interposed between the magneto-optical crystals an $n\lambda/4$ plate the principal direction of which is inclined at an angle of 45° to the principal directions of the other plates.

20. An apparatus as claimed in claim 16, characterized in that the modulator comprises the series combination of ($22+1$) magneto-optical crystals (where $n$ is an integer).

21. An apparatus as claimed in claim 20, characterized in that there is a phase difference of 90° between the alternating magnetization produced in the even-numbered magneto-optical crystals and that produced in the odd-numbered magneto-optical crystals.

22. An apparatus as claimed in claim 20, characterized in that the sum of the amplitudes of the magnetizations produced in the even-numbered magneto-optical crystals and the sum of the amplitudes of the magnetizations produced in the odd-numbered magneto-optical crystals cause a rotation of the plane of polarization which is equal or substantially equal to 180°.

23. An apparatus as claimed in claim 20, characterized in that there is arranged in the paths of two of the subbeams diffracted by the grating a magneto-optical modulator in which magnetizations are produced which are opposite to one another.

* * * * *

UNITED STATES PATENT OFFICE
CERTIFICATE OF CORRECTION

Patent No. 3,630,622  Dated December 28, 1971

Inventor(s) HENDRIK DE IANG AND GIJSBERTUS BOUWHUIS

It is certified that error appears in the above-identified patent and that said Letters Patent are hereby corrected as shown below:

Col. 3, line 12, "$I_2 = \text{const.} + b\pi\sin(\Omega t + 8\pi z/p)$" should be --$I_2 = \text{const.} + b\sin(\Omega t + 8\pi z/p)$--;

Col. 4, line 3, "$A_2\sin(\omega \underline{b}J\ 1\ \underline{b}\sin\Omega \underline{t} - 2\pi \underline{z/p})$" should be --$A_2 \sin(\omega \underline{t} - \underline{b} \sin\Omega \underline{t} - 2\pi \underline{z/p})$--;

line 6, "$C_{117}\ 1$" should be --$C_{+1}$--;

line 61, "$A_4\cos(\omega t + \underline{b}\sin\Omega \underline{t} - 4\pi z/p) + A) + \sin(\omega \underline{t} - \underline{b}\sin\Omega \underline{t} + 4\pi z/p) = 2A_4\sin(\omega t + ^2/_34)\sin(-\underline{b}\sin\Omega \underline{t} + 4\pi z/p + \pi/4).$" should be --$A_4\cos(\omega t + \underline{b}\sin\Omega \underline{t} - 4\pi z/p) + A_4\sin(\omega \underline{t} - \underline{b}\sin\Omega \underline{t} + 4\pi z/p) = 2A_4\sin(\omega t + \pi/4)\sin(-\underline{b}\sin\Omega \underline{t} + 4\pi z/p + \pi/4).$--;

Col. 5, line 2, "4" should be --an angle--;

line 35, "$(\omega \underline{t} + \underline{b}\sin\Omega \underline{t} - 2\pi z/p)$ should be --$(\omega \underline{t} - \underline{b}\sin\Omega \underline{t} - 2\pi z/p)$--;

lines 75 and 76, "$A_4\cos(\omega \underline{t} + \underline{b}\sin\Omega \underline{t} - 4\pi\pi z/p) + A_4\cos(\omega \underline{t} - \underline{b}\sin\Omega \underline{t} 4\pi z/p) = 2A_4\cos\omega \underline{t}\cos(\sin\Omega \underline{t} - 4\pi z/p).$" should be --$A_4\cos(\omega \underline{t} + \underline{b}\sin\Omega \underline{t} - 4\pi z/p) + A_4\cos(\omega \underline{t} - \underline{b}\sin\Omega \underline{t} + 4\pi z/p) = 2A_4\cos\omega \underline{t}\cos(\underline{b}\sin\Omega \underline{t} - 4\pi z/p)$--;

UNITED STATES PATENT OFFICE
CERTIFICATE OF CORRECTION

Patent No. 3,630,622  Dated December 28, 1971

Inventor(s) HENDRIK DE LANG and GIJSBERTUS BOUWHUIS

It is certified that error appears in the above-identified patent and that said Letters Patent are hereby corrected as shown below:

Col. 6, line 6, "$\cos(2\underline{b}\sin\Omega - 8\pi z/p)$" should be --$\cos(2\underline{b}\sin\Omega t - 8\pi z/p)$--;

line 62, "$_o + 1/2\phi C_o - 4\pi z/p$" should be --$_o + 1/2\phi = C_o - 4\pi z/p$--;

line 70, "$\alpha(z,t) = C - 4\pi z/p + z/p\beta 1\sin\Omega t.$" should be --$\alpha(z,t) = C - 4\pi z/p + \beta_1 \sin\Omega t.$--;

Col. 7, line 17, "$4\pi z/p + \sin\Omega t$" should be --$4\pi z/p + \beta \sin\Omega t$--;

Col. 8, line 13, "$A_o \sin\Omega$" should be --$A_o \sin\Omega t$--;

line 63, "$A_3 \sin(\omega t - 4\pi z/p + 2\phi \sin\omega t)$" should be --$A_3 \sin(\omega t - 4\pi z/p + 2\phi \sin\Omega t)$--;

Col. 9, line 9, "Asin" first occurence should be --$A_3 \sin$--;

line 19, after "respectively." "When" should start a new paragraph;

line 28, in the parenthesis cancel "$\pi$" 2nd occurence;

UNITED STATES PATENT OFFICE
CERTIFICATE OF CORRECTION

Patent No. 3,630,622    Dated December 28, 1971

Inventor(s) Hendrik De Lang et al.    PAGE - 3

It is certified that error appears in the above-identified patent and that said Letters Patent are hereby corrected as shown below:

Claim 13, line 1, "2" should read -- 1 --. Claim 20, line 2, "22+1" should read -- 2n+1 --.

Signed and sealed this 4th day of July 1972.

(SEAL)
Attest:

EDWARD M. FLETCHER, JR.          ROBERT GOTTSCHALK
Attesting Officer                Commissioner of Patents